Patented Dec. 11, 1923.

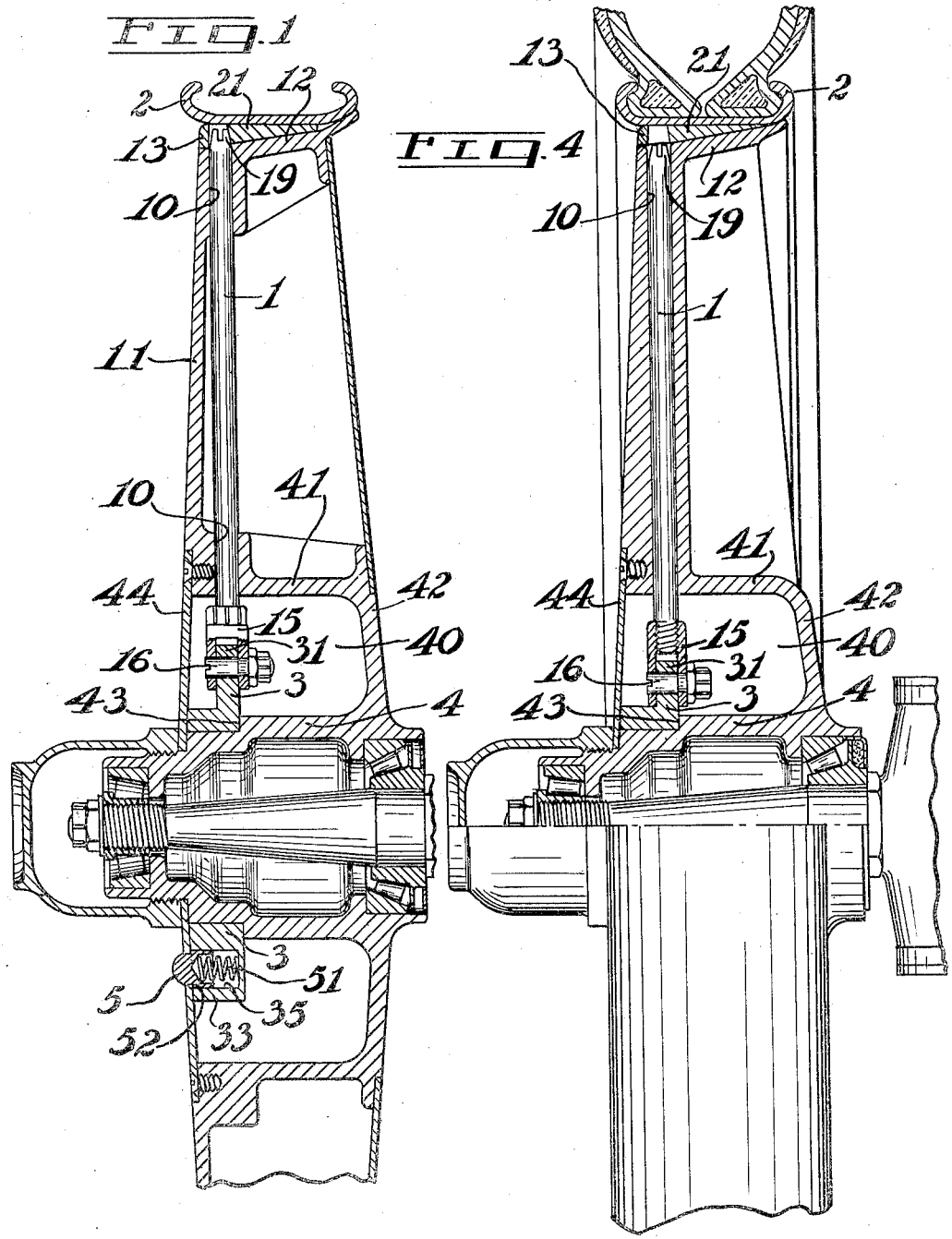

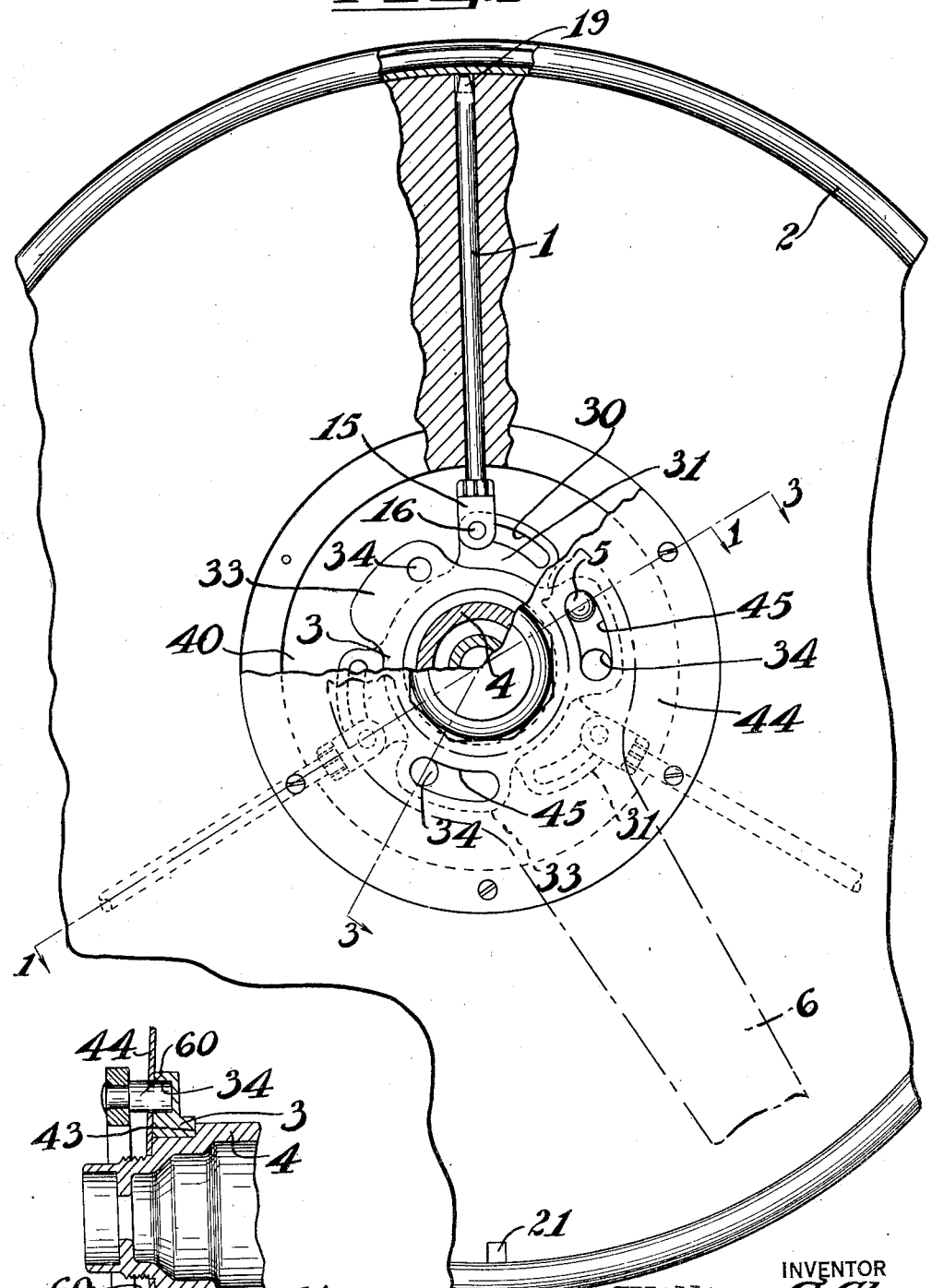

1,476,952

UNITED STATES PATENT OFFICE.

WILLIAM A. CLENCH, OF SEATTLE, WASHINGTON.

LOCKING DEVICE FOR WHEEL RIMS.

Application filed April 7, 1921. Serial No. 459,321.

*To all whom it may concern:*

Be it known that I, WILLIAM A. CLENCH, a citizen of the United States of America, and resident of the city of Seattle, in the county of King and State of Washington, have invented certain new and useful Improvements in Locking Devices for Wheel Rims, of which the following is a specification.

My invention comprises a device for locking a demountable rim upon a wheel, particularly upon disk wheels, and to devices for operating such locking means.

It is my object to provide means which can be operated from the hub of a wheel by a suitable wrench to lock a demountable rim upon the fixed rim of the wheel and to unlock it therefrom when desired, and which are adjustable for variations in the size of the fixed or demountable rims.

Another object of my invention is to provide such operating means for a demountable rim locking device which may be easily operated but which cannot admit dirt or water to the interior working parts thereof, or to the interior of an automobile disk wheel.

Another object is to provide conveniently operable means for securing and releasing such locking means.

My invention comprises those novel parts and combinations thereof which are shown in the accompanying drawings, described in the specification and particularly defined by the claims terminating the same.

In the accompanying drawings I have shown my invention in forms which are now preferred by me.

Figure 1 is an axial section through an automobile disk wheel showing my invention mounted therein and taken on the line 1—1 of Figure 2.

Figure 2 is an elevation with parts broken away and parts shown in section, of the wheel shown in Figure 1.

Figure 3 is a section on line 3—3 of Figure 2, portions of the wheel structure being omitted.

Figure 4 is a partial section, similar to Figure 1, of a single disk wheel with my invention incorporated therewith.

In connection with my present invention I employ a locking member 1 having an inclined end 19 and which is reciprocable within guides 10 positioned behind the front disk 11 of a wheel, and which is projectable through the fixed rim 12 of the wheel. In the case of a double disk wheel, as in Figure 1, the guides 10 may be separated, but in the case of a single disk wheel, as shown in Figure 4, the guide should be a continuous one extending from hub to rim of the wheel.

The demountable rim 2 is provided with a number of inclined lugs 21 which fit within similarly-inclined transverse grooves 13 in the fixed rim 12. The demountable rim is fitted upon the wheel while the reciprocable locking members 1 are retracted and their inclined ends 19 are then projected in front of the lugs 21 to secure the demountable rim in place. Additional lugs 21 may be provided if desired to lessen the strain upon each one of these.

As a means of reciprocating the bar 1 I provide a forked yoke 15 which is threaded upon its inner end and in which is secured a pin 16. This pin passes through a cam slot 30 which is formed in a lug 31 of a series formed upon the ring 3. The slot 30 extends through a suitable angular extent, and one end is spaced farther from the center of the wheel than the other. This gives the reciprocatory motion to the bar 1 when the ring is rotated. The ring 3 is rotatably mounted upon the hub 4 of the wheel.

According to my present invention I provide an annular chamber 40 which surrounds the main hub 4. A wall 41 outward of the hub 4, together with the hub proper and a rear wall 42, define this chamber. Within the chamber 40 the ring 3 is mounted. Its inner face is preferably seated against a shoulder 43 within the chamber 40 and its forward face is seated closely against a plate 44 which closes the open outer side of the chamber 40.

Upon the ring 3 I provide a second series of lugs 33 which lie closely against the inner face of the plate 44 and which have axially-extending sockets 34 therein. The plate 44 is provided with a series of slots 45 extending through a given angular extent, and preferably of equal extent with the slots 30 and formed on circular arcs. The sockets 34 may be of any shape, but should be of less angular extent than the slots 45.

It is my intention to insert a spanner wrench 6 in the sockets 34, projecting the pins 60 of the wrench through the slots 45. In this manner the ring 3 may be engaged to be rotated from without the wheel, and without removing the plate 44 or other parts of the wheel. The lugs 33 lying closely against the inner face of the plate 44 will not permit dirt, grit, or even water to enter the chamber 40 or to reach the working parts of the wheel or locking device, at least while the parts are in normal or locking position. This is clearly shown in Figure 2.

I provide means for securing the ring 3 in rim-locking position. I have shown in Figures 1 and 3 of the drawings a rounded end plunger 5 reciprocable within a socket 35 in the ring 3. This is normally held projected by a spring 51. The outer end of the plunger 5 projects through a slot 45 and shoulders 52 on the plunger engage the inner face of the plate 44 to prevent the plunger being removed through the slot. This plunger is so spaced from a socket 34 that when the socket is in rim-locked position, at one end of the slot 45 with which it registers, the plunger 5 will be projected through the slot 45 and will engage its other end to prevent reverse rotation of the ring. When it is desired to unlock the rim the plunger 5 can be depressed and slid beneath the plate 44, and the ring rotated by engagement thereof with a wrench, as described above.

By inclining the ends 19 of the locking bars which engage the lugs 21, the inclined lugs 21 may be forced back to force the rim 2 upon the fixed rim 12, using the leverage of the wrench 6. This produces a powerful thrust, capable of seating the rim securely in place, and as the lugs 21 and the grooves in which they seat are themselves inclined, when the lugs are forced back into the grooves they will expand the rim 2 to more securely hold it, and to prevent it from rattling or squeaking. If the size of the fixed rim 12 or the demountable rim 2 should vary from normal, or if parts of the grooves 13 or the inclined faces of the lug 21 or the end 19 of the locking rod 1 become worn, such differences can be compensated for by threading the rod 1 in or out in the yoke 15 by engaging a screw driver in the split end of the rod. If necessary, its outer end may be filed off, to permit its further projection.

What I claim as my invention is:

1. In a locking device for demountable-rim wheels including an actuator ring rotatable upon the wheel hub, a plate secured to the wheel and having slots therein extending through a circular arc, said ring having sockets therein of less angular extent than said slots and registrable therewith.

2. In a locking device for demountable-rim wheels including an actuator ring rotatable upon the wheel hub, a plate secured to the wheel and having slots therein extending through a circular arc, said ring having sockets therein of less angular extent than said slots and registrable therewith, and interengageable locking means upon said plate and ring to retain parts in rim-locking position.

3. In a locking device for demountable-rim wheels including an actuator ring having means for operating the same, means for retaining parts in rim-locking position comprising interengageable locking members carried upon the ring and the wheel, respectively, and automatically engageable when parts are in rim-locking position.

4. In a locking device for demountable-rim wheels including an actuator ring rotatable upon the wheel hub, a plate secured to the wheel and engageable with a face of said actuator ring, and having slots therein extending through a circular arc, said ring having sockets therein registrable with one end of the slots when parts are in rim-locking position, and a spring-pressed plunger carried by said ring and engageable with an end of a slot opposite the socket when parts are in rim-locking position, and depressible beneath said plate to permit the rim-releasing operation of said ring.

5. A locking device for demountable-rim wheels comprising, in combination with a wheel and a rim securable thereon, a plurality of locking members reciprocable within the wheel and engageable with the rim to secure it in place, a rotatable actuator ring mounted upon the wheel hub and engageable with the locking members to reciprocate them, a plate engageable with a face of the actuator ring to prevent removal thereof from the hub, said plate having slots therein extending through a circular arc and closed by said ring when parts are in locked position, and said plate having sockets therein registrable with an end of said slots.

6. A locking device for demountable-rim wheels comprising, in combination with a wheel and a rim securable thereon, a plurality of locking members reciprocable within the wheel and engageable with the rim to secure it in place, a rotatable actuator ring mounted upon the wheel hub and engageable with the locking members to reciprocate them, a plate engageable with a face of the actuator ring to prevent removal thereof from the hub, said plate having slots therein extending through a circular arc and closed by said ring when parts are in locked position, said plate having sockets therein registrable with an end of said slots, and interengageable locking means upon said plate and ring to retain parts in rim-locking position.

7. In a demountable-rim wheel, in combination with a disk wheel and a rim securable thereon, said wheel having a chamber surrounding its hub, an actuator ring rotatably mounted in said chamber, reciprocable locking members engageable with said rim to lock it in place and with said actuator ring for reciprocation thereby, a plate securable in said disk to close said chamber, and having slots therein extending through a circular arc, said ring having means engageable by a wrench through said slot, whereby it may be rotated, and interengageable means carried by said plate and ring for retaining parts in rim-locking position.

Signed at Seattle, King County, Washington, this 1st day of April, 1921.

WILLIAM A. CLENCH.